United States Patent Office 3,403,580
Patented Oct. 1, 1968

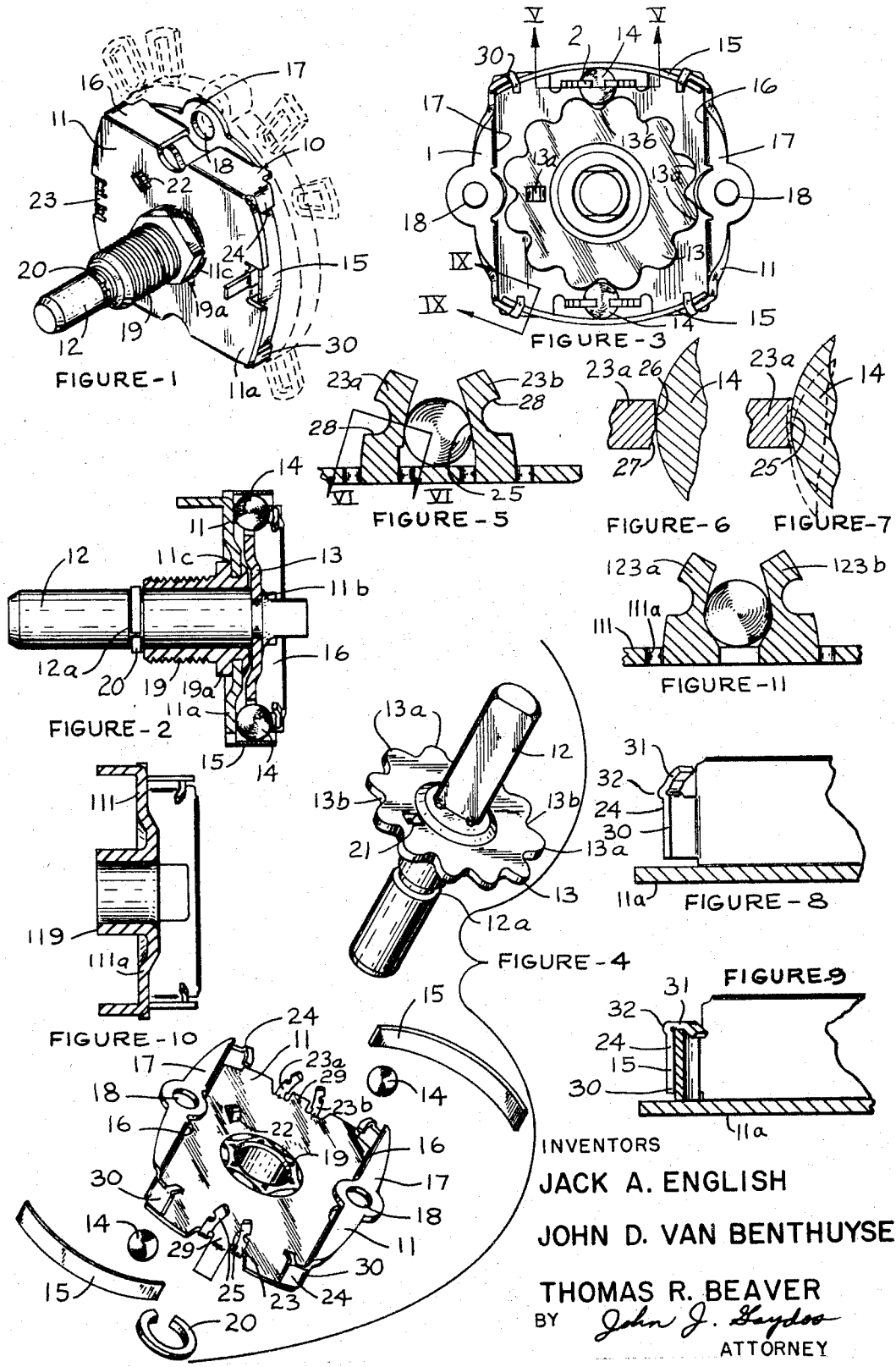

3,403,580
INDEXING MECHANISM AND METHOD OF
MAKING THE SAME
Jack A. English, 513 Bell Ave.; John D. Van Benthuysen,
R.R. 5, Aqua Drive; and Thomas R. Beaver, 311 Kenwood Ave., all of Elkhart, Ind. 46514
Filed Dec. 29, 1966, Ser. No. 605,711
14 Claims. (Cl. 74—527)

ABSTRACT OF THE DISCLOSURE

Indexing mechanism comprises malleable mounting plate, an actuating member such as a shaft journaled in the mounting plate and an indexical member such as a detent wheel attached to the actuating member. A detent element or ball is retained by malleable ball-retaining means integral with the mounting plate and is spring biased against the periphery of the detent wheel. The ball-retaining means permits movement of the ball radially of detent wheel but prevents movement of the ball tangentially of the wheel as the wheel is moved from one index position to another. The ball-retaining means comprises a pair of malleable arms integral with the mounting plate and formed around the ball. The malleable arms are sized to the ball by being deformed therearound, the ball serving as a mandrel. This deformation causes depressions to be formed in the arms where the arms engage the ball during deformation. The malleable arms are also preferably provided with areas of reduced cross section to control springback of the arms during deformation of the arms around the ball. A spring-retaining means includes shoulders formed from and integral with a mounting plate and malleable tabs are connected to the shoulders by knuckle joints.

The present invention relates to indexing mechanisms and, more particularly, to an indexing mechanism of the ball detent type.

Angular positioning of a shaft of a rotary switch generally depends upon an indexing mechanism. The accuracy and angular play of an indexing mechanism of the ball detent type usually depends upon the tolerance of a detent wheel and upon the fit between the detent ball and the ball-retaining means securing the ball to the mounting plate of the indexing mechanism. If the ball-retaining means securing the detent ball is part of a casting, e.g., a cylindrical opening or a recess defined by a pair of spaced walls or shoulders, the manufacturing expense of making the ball-retaining means to an extremely close tolerance for limiting later movement of the detent ball is prohibitive since a precise machining operation must be performed. Moreover, the manufacturing expense of making detent balls having a closer than standard tolerance corresponding to the tolerance of the ball-retaining means also increases. Although desirable, precise commercially manufactured indexing mechanisms of the ball detent type generally are not manufactured to closer than standard manufacturing tolerances because the cost of such indexing mechanism is unjustifiable. It would, therefore, be desirable to eliminate angular play of an indexing mechanism by providing an improved mounting plate having an extremely close fit between the detent ball and the ball-retaining means without increasing the cost of the indexing mechanism.

A leaf spring is usually employed for biasing a detent ball against a detent wheel of an indexing mechanism. To keep cost to a minimum it is preferable to assemble the spring automatically to a mounting plate of the indexing mechanism. Such assembly is, however, difficult since a spring-retaining means must maintain the ends of the spring normal to movement of the ball as the detent wheel is rotated. It would, therefore, also be desirable to employ an improved spring-retaining means facilitating mounting of the spring to the mounting plate of the indexing mechanism.

Accordingly, it is an object of the present invention to provide an improved ball detent indexing mechanism. An additional object of the present invention is to provide an indexing mechanism with virtually no rotational play when the shaft is in a stable position. Another object of the present invention is to provide an indexing mechanism capable of being automatically assembled in a simple and facile manner. A further object of the present invention is to provide a ball detent indexing mechanism having a ball-retaining means sized to an individual detent ball. Still an additional object of the present invention is to provide an indexing mechanism with a mounting plate formed from a single piece of sheet metal for supporting a detent ball, a leaf spring and a detent wheel. Still another object of the present invention is to provide a detent ball indexing mechanism with improved spring-retaining means supporting a spring biasing the detent ball against the detent wheel. Yet another object of the present invention is to provide a new and improved method of making a detent indexing mechanism wherein malleable detent element retaining means are sized to a detent element by positioning the detent element adjacent to the malleable detent element retaining means and then deforming the retaining means around the detent element while utilizing the detent element as a mandrel. Further objects and advantages of the present invention will become apparent as the following description proceeds, and the features of novelty characterizing the invention will be pointed out with particularity in the claims annexed to and forming a part of this specification.

Briefly, the present invention is concerned with an indexing mechanism comprising a detent wheel attached to a shaft journaled in a mounting plate formed of sheet material and a detent ball biased against the periphery of the detent wheel by a spring. A ball-retaining means integral with the mounting plate prevents motion of the detent ball tangentially of the detent wheel but permits radial motion of the ball as the detent wheel is rotated. The ball-retaining means is malleable and preferably is sized to the individual ball retained therein eliminating all clearance between the ball-retaining means and the ball. Preferably the ball-retaining means comprises a pair of arms integral with the mounting plate and swaged around the ball providing an opening sized to the ball. A spring-retaining means including a pair of shoulders integral with the mounting plate and tabs connected to the shoulders by knuckle joints supports the spring biasing the ball against the detent wheel and facilitates automatic assembly of the spring to the mounting plate.

For a better understanding of the present invention reference may be had to the accompanying drawings wherein the same reference numerals have been applied to like parts and wherein: FIGURE 1 is an isometric view of an indexing mechanism built in accord with the present invention and of a selector switch shown in phantom; FIGURE 2 is a cross sectional view of the indexing mechanism shown in FIGURE 1; FIGURE 3 is a rear plan view of the indexing mechanism shown in FIGURE 1; FIGURE 4 is an exploded view of the indexing mechanism shown in FIGURE 1; FIGURE 5 is an enlarged fragmentary sectional view taken along line V—V of FIGURE 3 showing a ball-retaining means; FIGURES 6 and 7 are respectively a grossly enlarged fragmentary cross section of the ball-retaining means taken along line VI—VI of FIGURE 5 before and after the sizing operation assuming FIGURE 5 is shown in full; FIGURE 8 is an enlarged fragmentary cross section of a spring-retaining means taken along line IX—IX of FIGURE 3 before automatic assembly of the spring to the mounting plate; FIGURE 9 is an enlarged fragmentary cross section similar to FIGURE 8 but after the spring has been automatically assembled and secured to the mounting plate; FIGURE 10 is a cross sectional view of another form of mounting plate for a ball detent indexing mechanism; and FIGURE 11 is an enlarged fragmentary cross sectional view of another embodiment of a ball-retaining means.

Referring now to the drawings, there is illustrated a ball detent indexing mechanism, generally indicated at 10, suitably secured to a selector switch shown in phantom or other component requiring selective angular positioning. The ball detent indexing mechanism comprises a mounting plate 11 stamped from sheet metal, such as steel, rotatably supporting a shaft 12 carrying a detent wheel 13. It is essential that the sheet metal be of malleable material, i.e., capable of being formed. A pair of detent balls 14 are biased by a pair of springs 15 against the detent wheel.

Considering first the mounting plate it comprises an apertured flat portion 11a having a pair of end walls 16 extending rearwardly from the flat portion 11a and then outwardly parallel to the flat portion defining a pair of lateral flanges 17 provided with holes 18 for securing the indexing mechanism 10 to the selector switch with a pair of suitable fasteners. Maximum usable distance between the end walls 16 is obtained by removing a portion of the end walls adjacent to the holes 18 to eliminate interference between the detent wheel and the end walls 16. An externally threaded bushing 19 received in the aperture 11b (see FIGURE 2) of the flat portion 11a is staked to the mounting plate 11 and a noncircular portion 19a of the bushing 19 received in a corresponding noncircular portion 11c circumposing the aperture prevents relative rotation between the bushing and the mounting plate. A nut threadedly engaging the bushing secures the indexing mechanism to a not-shown mounting panel.

In a preferred form of the invention, the shaft 12 is rotatably supported in the bushing 19. The shaft can, however, be rotatably supported in an embossed bushing 119 (see FIGURE 10) integral with the flat portion 111a of a mounting plate 111. The detent wheel 13 disposed between the end walls 16 is fixedly secured to the shaft in a suitable manner such as by staking, and a C-washer 20 disposed in an annular groove 12a provided in the shaft 12 adjacent to the threaded bushing 19 limits inward movement of the shaft relative to the bushing. Depending upon the number of indexing positions desired, the detent wheel is appropriately provided with a corresponding number of peripheral hills 13a and dales 13b or undulations. Rotation of the shaft can be limited to less than 360° by a forwardly extending stop arm 21 integral with the detent wheel and engageable with a rearwardly extending stop member 22 integral with the flat portion 11a of the mounting plate 11.

The detent balls 14 are retained in a pair of diametrically opposed malleable ball-retaining means 23 integral with the mounting plate and are biased against the peripheral hills 13a and dales 13b of the detent wheel 13 by the springs 15, preferably leaf springs, having their ends secured to the mounting plate by a pair of spring-retaining means 24. Before assembly each of the ball-retaining means 23 preferably comprises a pair of parallel spaced rearwardly extending allochiral arms 23a and 23b integral with the mounting plate to facilitate insertion of the detent balls into the ball-retaining means while the mounting plate is supported in an inverted position such as shown in FIGURE 4 of the drawings. The arms are then swaged around the ball, the ball acting as a mandrel sizing the opening of the ball-retaining means to the ball. By swaging the arms around a ball to be permanently trapped by the ball-retaining means, the dimension of the opening corresponds directly to the diameter of the ball and movement of the ball tangentially of the detent wheel is eliminated. After the sizing operation, the arms 23a and 23b spring back slightly, i.e., just enough to permit the detent ball to clear the depressions 25 (see FIGURE 7) made in the arms 23a and 23b, the dashed lines in FIGURE 7 showing the amount of springback. As will be explained hereinafter, after sizing, little or no clearance exists between the arms, 23a, 23b and the detent ball 14 when the shaft is in the stable position even though the arms spring back slightly. When the arms are preformed without a mandrel to the diameter of the ball, then only the leading edge 26 (see FIGURE 6) of the ball-retaining means 23 prevents tangential movement of the ball, since during the stamping operation, a portion of the material is removed from the arms by a shearing action of the punch and die and the remaining portion of the material is torn away. The shearing action forms the leading edge 26 and a torn edge 27. By sizing the arms to the detent ball when the center of the ball is aligned with the central axis of the arms, the depressions 25 made in the arms form uniform edges engaging the ball. But by shifting and maintaining the center of the detent ball in alignment with the front faces of the arms as shown in dashed line in FIGURE 7, virtually no clearance exists between the ball-retaining means and the detent ball while the shaft is in the stable position. Spring back of the rearwardly extending allochiral arms is partially controlled by providing a notch 28 in each of the stressable portions of the arms opposite the depressions 25 or ball-engaging portions. Preferably, the thickness of the arms should be equal to or greater than the radial movement of the ball to assure that the maximum diameter of the ball is within the width of the arms while the detent wheel is being rotated. In the embodiment shown in FIGURES 1 to 9 of the drawings, forward movement of the ball is limited by a ball-supporting track 29. As shown in FIGURE 11 of the drawings, a pair of rearwardly extending arms 123a and 123b can also be spaced apart at their junction to the flat portion 111a of the mounting plate 111 a distance less than the diameter of the ball to limit forward movement of the ball.

As best shown in FIGURE 8 of the drawings, the spring-retaining means 24 comprises a pair of shoulders 30 integral with the end walls 16 and extending from opposite ends thereof. Each shoulder 30 is preferably provided with a rearwardly extending tab 31 spaced from the flat portion 11a. At the junction between the shoulder and the tab, a knuckle joint 32 is formed by forcing the material from the inner surface of the tab outwardly into and beyond the original outer surface of the tab. By providing each of the tabs with a knuckle joint, the tabs can be bent 90° to secure accurately the ends of the springs to the mounting plate. Moreover, the knuckle joint forms a square corner between the inner surface of the shoulder and the tab for maintaining the spring normal to the flat portion 11a of the mounting plate (see FIGURE 9). Since the tabs are integral with the shoulders and the shoulders are integral with the end walls which in turn are integral with the flat portion, the tabs are integral with the flat portion. A pair of detent balls generally are employed for balancing the forces of the springs against the shaft and for eliminating bearing pressures normal to the axis of the shaft. A single ball detent can, however, be employed for certain applications.

While there has been illustrated and described what is at present considered to be a preferred embodiment of the present invention, and an additional embodiment thereof, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. An indexing mechanism for a rotary switch comprising a mounting plate, a shaft rotatably secured to the mounting plate, a detent wheel having an undulated periphery secured to the shaft, a ball engaging the periphery of the detent wheel, malleable means integral with the mounting plate restricting the ball to movement radially of the detent wheel, a spring biasing the ball against the periphery of the wheel, and means securing the spring to the mounting plate, the malleable means comprising arms formed from the mounting plate and deformed around the ball, the arms each having an inner surface with a curved depression corresponding to the curvature of the ball, the ball providing a mandrel for the arms during deformation thereof and thereafter being trapped by the arms to provide a detent for the detent wheel.

2. The mechanism of claim 1, wherein each of the arms comprises a base portion and a ball-engaging portion extending between the base portion and an end portion, said ball-engaging portion having a cross section less than either of the other portions thereby to at least partially control the springback of the arms during deformation thereof.

3. The mechanism of claim 1, wherein a track integral with the mounting plate engages the ball for limiting movement of the ball forwardly and for guiding movement of the ball radially of the detent wheel.

4. The mechanism of claim 1, wherein the malleable means comprises a pair of spaced rearwardly extending ball-retaining arms integral with the mounting plate, the ball being trapped between the arms, and the arms being swaged around the ball providing an opening sized to the ball.

5. The mechanism of claim 4, wherein the thickness of the arms in the direction of movement of the ball is at least equal to the distance the ball moves as the wheel is rotated from one indexing position to another indexing position.

6. An indexing mechanism for a rotary switch comprising a mounting plate, a shaft rotatably secured to the mounting plate, a detent wheel secured to the shaft, a pair of diametrically opposed balls engaging the detent wheel, a pair of ball-retaining arms integral with the mounting plate and on opposite sides of the mounting plate restricting the balls to movement radially of the detent wheel, each pair of said arms being swaged around the ball, the ball providing a mandrel around which the arms are shaped to form an opening sized to the ball, a track integral with the mounting plate engaging the ball for limiting forward movement of the ball with respect to the mounting plate, a pair of leaf springs carried by the mounting plate and biasing the balls against the detent wheel, and a pair of knuckle joints integral with the mounting plate securing each of the leaf springs to the mounting plate.

7. An indexing mechanism for a rotary switch comprising a mounting plate, a shaft rotatably secured to the mounting plate, a detent wheel carried by the shaft, a ball engaging the periphery of the detent wheel, ball-retaining means carried by the mounting plate restricting the ball to movement radially of the detent wheel, a spring biasing the ball in the periphery of the detent wheel, a pair of tabs securing the ends of the spring to the mounting plate, and a knuckle joint connecting each of the tabs to the mounting plate.

8. The mechanism of claim 7, wherein the ball-retaining means comprises a pair of arms lying in a plane parallel to the axis of the shaft, the spring flexes in a direction normal to the axis of the shaft, and the tabs folded inwardly toward the shaft.

9. In an indexing mechanism for a rotary switch, the combination of a mounting plate, said mounting plate comprising an apertured flat portion of sheet metal, a pair of end walls of sheet metal integral with opposite sides of the flat portion and extending rearwardly of the flat portion, a pair of flanges integral with the end walls and extending outwardly thereof, the flanges being provided with means for securing the mounting plate to a component, and retaining means integral with the flat portion and extending rearwardly thereof retaining the detent means, said retaining means being malleable and formed to the detent means, a detent wheel rotatably secured to the mounting plate, a detent means carried by the mounting plate engaging the detent wheel, and spring means retained by the mounting plate biasing the detent means against the detent wheel.

10. The indexing mechanism of claim 9, wherein a spring-retaining means integral with the flat portion retains the spring means, said spring-retaining means comprising a pair of tabs, and a pair of knuckle joints connects the tabs to the flat portion.

11. A method of making a ball detent indexing mechanism having an indexical detent member, a ball engaging the indexical detent member, malleable ball-retaining means restricting the ball to straight line movement toward and away from the indexical member, and spring means biasing the ball toward the indexical member, said method comprising the steps of:
  (a) positioning the ball adjacent the malleable ball-retaining means,
  (b) swaging the malleable ball-retaining means around the ball and forming surface depressions in the malleable ball-retaining means with the surface depressions conforming to the surface of the ball in contact therewith during the swaging step, and
  (c) biasing the ball toward the indexical detent member with the spring means.

12. In a method for making a detent indexing mechanism having an indexical detent member, a movable detent element, spring means biasing the movable detent element toward the indexical detent member and a pair of spaced malleable arms restricting the movable detent element to movement toward and away from the indexical detent member, the steps comprising:
  (a) positioning the movable detent element between the spaced malleable arms,
  (b) swaging the spaced malleable arms around the movable detent element while utilizing the movable detent element as a mandrel and thereby sizing the malleable arms to the movable detent element, and
  (c) biasing the detent element toward the indexical detent member with the spring means.

13. A method of making a ball detent indexing mechanism comprising the steps of:
  (a) forming a pair of spaced malleable arms on a malleable mounting plate,
  (b) positioning a ball between the malleable arms,
  (c) swaging the malleable arms around the ball and forming depressions in the malleable arms with the depressions conforming to the surface of the ball in contact therewith during the swaging step,
  (d) securing the ends of a spring to the mounting plate, and
  (e) biasing the ball with the spring toward a detent wheel rotatably supported by the mounting plate.

14. A method of making a detent indexing mechanism comprising the steps of:
  (a) forming a pair of spaced malleable arms and spaced malleable shoulders on a malleable mounting plate,
  (b) sizing the pair of malleable arms to a detent element disposed between the arms,
  (c) assembling a spring to the mounting plate with the end portions of the spring each bearing against one of the spaced malleable shoulders and the center portion of the spring biasing the detent element toward a detent wheel rotatably supported by the mounting plate, and
  (d) bending the shoulders to form tabs extending across the end portions of the spring to secure accurately the ends of the spring to the mounting plate.

References Cited

UNITED STATES PATENTS

| | | | |
|---|---|---|---|
| 2,153,430 | 4/1939 | Newman | 74—527 X |
| 2,778,229 | 1/1957 | Simpson et al. | 74—10.41 |
| 2,837,933 | 6/1958 | Patla | 74—10.41 X |
| 2,841,663 | 7/1958 | Anderson | 200—166 |
| 3,293,382 | 12/1966 | Lewandowski et al. | 74—527 |

FRED C. MATTERN, JR., *Primary Examiner.*

C. F. GREEN, *Assistant Examiner.*